(12) United States Patent
Rubin et al.

(10) Patent No.: US 7,285,173 B2
(45) Date of Patent: Oct. 23, 2007

(54) DESOLDERING SYSTEMS AND PROCESSES

(75) Inventors: Wallace Rubin, Middlesex (GB); Pierce A. Pillon, Amarillo, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 769 days.

(21) Appl. No.: 10/718,893

(22) Filed: Nov. 21, 2003

(65) Prior Publication Data

US 2005/0112284 A1 May 26, 2005

(51) Int. Cl.
*B23K 1/018* (2006.01)
*B23P 17/04* (2006.01)

(52) U.S. Cl. .......................... 148/23; 228/35; 428/605; 428/624

(58) Field of Classification Search .................. 148/23; 428/605, 624; 228/19, 35, 125
See application file for complete search history.

(56) References Cited

U.S. PATENT DOCUMENTS

| | | | |
|---|---|---|---|
| 4,081,575 A | 3/1978 | Spirig | |
| 4,092,182 A | 5/1978 | Arbib et al. | |
| 4,204,889 A | 5/1980 | Allen et al. | |
| 4,323,631 A | 4/1982 | Spirig | |
| 4,940,498 A | 7/1990 | Rubin | |
| 4,960,236 A | 10/1990 | Hedges et al. | |
| 5,305,941 A | 4/1994 | Kent et al. | |
| 5,484,979 A * | 1/1996 | Gao | ........................ 219/121.64 |
| 5,909,838 A | 6/1999 | Jimarez et al. | |

FOREIGN PATENT DOCUMENTS

GB  1550648  8/1979

* cited by examiner

*Primary Examiner*—Roy King
*Assistant Examiner*—Ngoclan T. Mai
(74) *Attorney, Agent, or Firm*—William D. Jackson

(57) ABSTRACT

A process for recovering a solder contaminant from a substrate surface with a wick structure comprising a plurality of heat conductive metal strands and a desoldering flux comprising a mixture of a first component of a partially polymerized rosin having a melting point of at least 98° C., a second component which is present in the desoldering flux formulation in an amount which is no more than the amount of the first component and comprises an ester of a polyhydric alcohol and benzoic acid, and a third component, which is present in an amount which is less than the amount of the second component, and comprises an aliphatic dicarboxylic acid. The solder contaminant is contacted with the wick structure in the presence of the desoldering flux and the wick structure and the solder contaminant are heated to melt the solder contaminant to cause the melted solder to flow into the wick structure in contact with the heat conductive metal strands. The wick structure containing the solder contaminant is withdrawn from the substrate surface.

29 Claims, 1 Drawing Sheet

DESOLDERING SYSTEMS AND PROCESSES

FIELD OF THE INVENTION

This invention relates to the removal of solder from substrate surfaces, and more particularly, to desoldering wicks and desoldering fluxes and their use in removing solder contaminants from substrate surfaces.

BACKGROUND OF THE INVENTION

Solder may be removed from soldered joints, for repair of electronic circuitry and other substrate surfaces, such as found in circuit boards or electronic components through the use of solder wicks, which are effective in withdrawing molten solder from the joint or surface under repair or undergoing other treatment. Typically, the solder to be removed is heated to its melting temperature, then withdrawn from the surface by capillary transport through the use of a so-called solder wick which is coated with a desoldering flux. Alternatively, an unfluxed wick may be employed with a flux being separately applied to the solder removal site as the heated solder wick is brought into contact with the solder.

Desoldering wicks are available in various configurations. They may be in the form of metal strands of copper, which are twisted together in a braid formed of a large number of individual strands. The wicks may be free of flux or they may be coated with a flux such as disclosed in U.S. Pat. No. 4,081,575 to Spirig. Desoldering wicks may also take the form of metal foils, such as disclosed in U.S. Pat. No. 5,909,838 to Jimarez. Other soldering wicks may take the form of metal strands woven in the form of various meshes or fabrics of various configurations, such as disclosed in U.S. Pat. No. 5,305,941 to Kent.

BRIEF SUMMARY OF THE INVENTION

In accordance with the present invention, there is provided a process for recovering a solder contaminant from a substrate surface. In carrying out the invention, there is provided a wick structure comprising a plurality of heat conductive metal strands. In addition, there is provided a desoldering flux comprising a mixture of a first component of a partially polymerized rosin having a melting point of at least 98° C. and a second component which is present in the desoldering flux formulation in an amount which is no more than, and preferably less than, the amount of the first component. The second component comprises an ester of a polyhydric alcohol and benzoic acid. The desoldering flux composition further comprises a third component which is present in a relatively minor amount and is, in any case, contained within the flux formulation in an amount which is less than the amount of the second component. The third component comprises an aliphatic dicarboxylic acid, preferably one having from 2 to 12 carbon atoms. In removing the solder contaminant, the solder contaminant on the substrate surface is contacted with the wick structure in the presence of the desoldering flux. The wick structure and the solder contaminant are heated to a temperature sufficient to melt the solder contaminant to cause the melted solder to flow into the wick structure in contact with the heat conductive metal strands. The wick structure containing the solder contaminant is withdrawn from the substrate surface.

In a further aspect of the present invention, there is provided a novel desoldering wick incorporating a wick structure comprising a plurality of heat conductive metal strands and a desoldering flux. The wick structure may take any suitable form, but preferably is of an elongated multi-strand structure wherein the individual strands of the multi-strand structure are configured in a helical configuration along the longitudinal axis of the wick structure. Preferably, the wick structure is in the form of a flattened "tape" which has an ellipsoidal cross-section. Such desoldering wicks are derived from an original strand structure having a generally circular transverse cross-section which is then flattened to provide a tape which has a width of perhaps 4 to 15 times the thickness of the tape.

The desoldering flux is incorporated with the wick structure to provide a surface coating on at least a portion of the metal strands. The desoldering flux comprises three components. The first component is a partially polymerized rosin having a melting temperature of at least 98° C. The second component comprises an ester of a polyhydric alcohol and benzoic acid. The second component is present in the flux formulation in an amount which is no more than and preferably less than, the amount of the first component. The third component comprises a dicarboxylic acid having from 2 to 12 carbon atoms, and preferably from 6 carbon atoms, adipic acid, to 10 carbon atoms, sebacic acid.

In a preferred embodiment of the invention, the desoldering flux is incorporated into the wick structure in an amount within the range of 1-5 wt. % of the wick structure, and preferably in an amount within the range of 1-3 wt. % of the wick structure. The first flux component and the second flux component are present in amounts to provide a weight ratio of the first component to the second component within the range of 1:1-4:1 and preferably within the range of 2:1-4:1. In a specific embodiment of the invention, the first flux component is a partially polymerized rosin having a dimer content within the range of 30-50%. The second flux component is pentaerythritol tetrabenzoate and the third component is sebacic acid. The first and second components are present in a weight ratio of 3:1 and the sebacic acid is present in an amount of less than 1 wt. %.

DETAILED DESCRIPTION OF THE INVENTION

The present invention involves the use of a desoldering flux composition which may be employed in conjunction with a desoldering wick for the recovery of unwanted solder deposits from substrate surfaces. The substrate surfaces to which the invention may be applied may be of any suitable type such as printed circuit boards, electronic components or other components and assemblies used in electronic systems. Any suitable wick may be employed in conjunction with the desoldering flux composition in carrying out the present invention. Thus, desoldering wicks such as disclosed in the aforementioned patents to Spirig, Jimarez or Kent may be employed in conjunction with the soldering flux of the present invention. The strands or fibers of the desoldering wicks may take the form of non-metallic fibers which are provided with a metal coating to produce metallized strands as disclosed in U.S. Pat. No. 4,323,631 to Spirig. While a preferred wick structure is of the multi-strand type having a generally flattened or ellipsoidal cross-section as described in greater detail below, for a description of other suitable soldering wicks for use in the present invention, reference may be made to the aforementioned U.S. Pat. No. 4,081,575 to Spirig, U.S. Pat. No. 4,323,631 to Spirig, U.S. Pat. No. 5,305,941 to Kent, and U.S. Pat. No. 5,909,838 to Jimarez, the entire disclosures of which are incorporated herein by reference.

Figure 1:
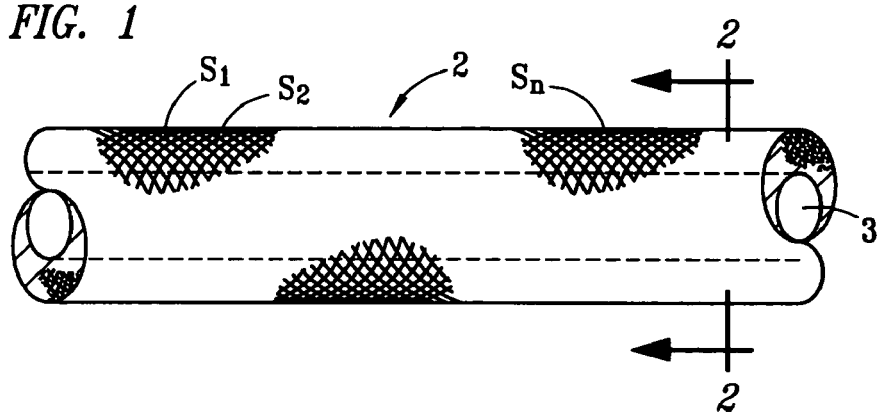
FIG. 1 is a side elevational view of an initially formed wick structure.
Figure 2:
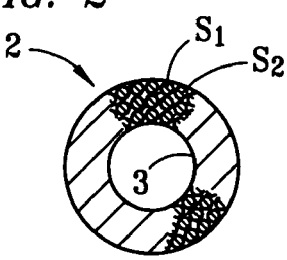
FIG. 2 is a cross-sectional view of the wick structure of FIG. 1.
Figure 3:
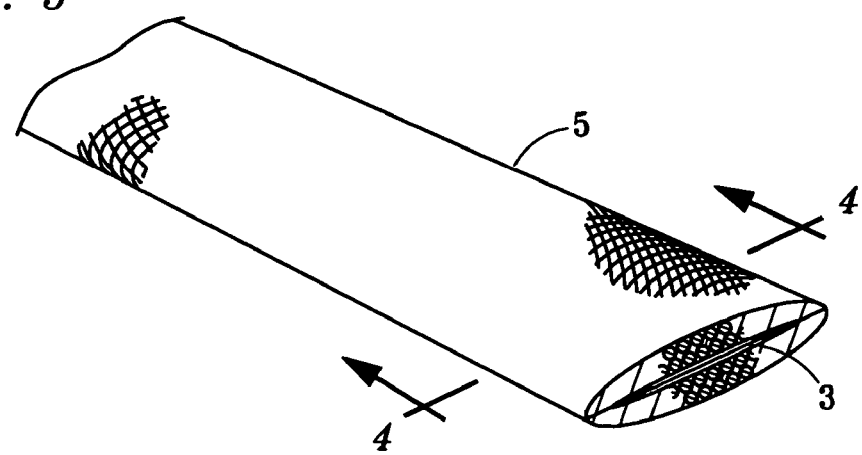
FIG. 3 is a perspective view of a final form of wick structure in the form of a "tape" configuration.
Figure 4:
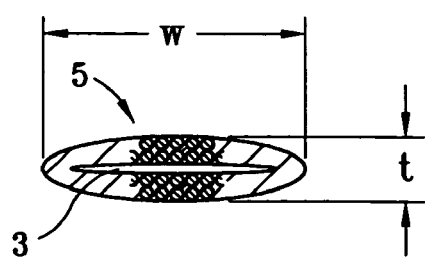
FIG. 4 is a cross sectional view of the wick structure of FIG. 3.

The preferred wick structure employed in carrying out the present invention is formulated of strands of highly heat conductive metal, preferably copper, which are configured of fine gauge wires which are twisted to form individual strands which are then helically configured along the major or longitudinal axis of the wick structure to provide a structure with an interior hollow core. FIG. 1 is a side elevational view of wick structure 2 which comprises a plurality of strands, $S_1, S_2, \ldots S_n$. The wick structure is configured to provide an annular configuration having a central bore extending longitudinally of the wick structure. The longitudinally extending bore 3 is indicated by the broken lines in FIG. 1. The elongated wick structure is initially of a generally circular configuration such as shown in greater detail in FIG. 2, which is a cross-sectional view taken transversely of the longitudinal axis of the wick structure. While the wick as thus configured can be employed in carrying out the present invention, preferably the initial circular structure is compressed to provide a flattened or ellipsoidal configuration to provide a wick structure 5 as shown in FIGS. 3 and 4. FIG. 3 is a perspective view of the wick structure which has been flattened to provide a desoldering wick in the form of a "tape" which can be wound on a reel. As shown in FIG. 3 and also in FIG. 4, the original bore 3 remains, although it now has a much smaller minor interior dimension. As shown in FIG. 4, both the exterior and interior dimensions of the wick structure are compressed together to provide a ratio of the transverse width of the wick structure, indicated by w, to the thickness, indicated by t, which preferably is within the range of 4 to 15. This configuration readily accommodates the incorporation of the desoldering flux within the wick structure. More preferably, the ratio of w/t for the desoldering wick is within the range of 6-10. The wick structures typically may be formed from fine gauge wires which are helically wound to form individual strands, containing typically from 3 to 8 small gauge wires which are, in turn, helically configured along the major axis of the wick structure. By way of example, a suitable wick structure can comprise from 36 strands of 42 gauge wire with 3 wires to a strand and 12 strands to make up the wick structure. Other suitable configurations are shown in the following table:

TABLE 1

| Part No. | Configuration |
|---|---|
| 18172 | 12 × 3 × 42 awg |
| 18174 | 16 × 4 × 42 awg |
| 18176 | 16 × 6 × 42 awg |
| 18178 | 24 × 5 × 42 awg |
| 18180 | 24 × 5 × 40 awg |
| 18182 | 24 × 8 × 40 awg |

The gauge dimensions used herein are American Wire gauge (AWG). Such wick structures are commercially available from the Techspray, a division of Tech Spray, L.P., Amarillo, Tex., under the designations indicated in Table 1. In the foregoing table, it will be recognized that Part no. 18172 involves 36 individual wires of 42 gauge wire. Part no. 18174 involves a total of 64 42 gauge wires, configured in a helical configuration of 16 strands with 4 wires per strand.

The flux formulation, as described in greater detail below, can be applied to the wick structure in a suitable amount, which typically will call for a flux formulation to be present in an amount within the range of about 1-5 wt. % of the wick structure. In most cases it will be preferred to employ the flux formulation in an amount within the range of 1-3 wt. % of the wick structure.

In applying the flux formulation to the wick structure, the elongated flexible wick is passed through a mild acid bath, such as an aqueous solution of a monobasic or dibasic carboxylic acid or hydroxy acid, while ultrasonic agitation is applied to the acid bath. Suitable acids include lactic acid, maleic acid, tartaric acid and citric acid. For example, the acid bath may take the form of 0.1-0.2 M citric acid, maleic acid or tartaric acid. As the wick structure is recovered from the bath, it passes through a drying cycle where the acid solution is evaporated. After the wick line is dried, it passes through a vat containing the flux formulation in a suitable liquid form arrived at by dissolving the flux components in the desired relative amounts in a suitable solvent. Suitable solvents include organic solvents, such as disclosed in U.S. Pat. No. 4,092,182 to Arbib et al., and may take the form of ketones, such as acetone or methyl isobutyl ketone, alcohols, such as isopropanol and aliphatic or cycloalkyl ethers, such as ethyl ether, n-butyl ether and tetrahydrofuran. The three flux components may be applied in a relatively low temperature solution of about 45-60° F.

The desoldering flux employed in the present invention comprises three components. The first component can be characterized as a polymerized rosin, more specifically, a partially dimerized rosin. The second component comprises an ester of polyhydric alcohol and benzoic acid, such as pentaerythritoltetrabenzoate and a third component comprises a dicarboxylic acid, such as adipic acid or sebacic acid. The various components of the desoldering flux employed in the present invention are, in themselves, known in the art and have been employed in various soldering flux formulations. For example, U.S. Pat. No. 4,092,182 to Arbib et al. discloses compositions incorporating components of the general nature described above which are used as soldering fluxes. However, contrary to the relative amounts of components disclosed in Arbib et al., in which an ester such as pentaerythritoltetrabenzoate is employed as a major component with the rosin derivative employed as a hardening component in a minor amount of 20 wt. % or less, the rosin and ester components employed in the present invention are provided in a reversed configuration in which the rosin component is employed in amount at least equal to the amount of the ester component, and preferably in an amount well in excess of the amount of the ester component.

The desoldering flux of the present invention also employs the partially dimerized rosin and the dicarboxylic acid components in relative amounts, which are substantially different than the use of these materials in conventional soldering fluxes. Referring again to the aforementioned patent to Arbib et al., the various examples there show the dicarboxylic acids in substantially higher concentrations relative to the rosins disclosed there than the relative amounts of dicarboxylic acids employed in the present invention.

As noted previously, the first component is a modified rosin in which a decrease in saturation has been accomplished by the partial polymerization of the abietic acid units of the rosin. The partially dimerized rosin typically will be characterized by 30-50 wt. % dimers, with the remainder characterized as resin acids of the abietic and the pimaric type, and trimers of such resin acids. A preferred modified rosin is the modified partially dimerized rosin available under the designation PolyPale resin. This rosin is disclosed in Organic Chemistry, Fieser & Fieser, Reinhold Publishing Corporation (1963), at page 877, the entire disclosure of which is incorporated herein by reference. PolyPale partially dimerized rosin is available from Eastman Chemical Company under product identification nos. 75239-(00), -(01), -(02), -(06), -(0Q), -(0R), -(05) and E 7523901. It is characterized by a saponification number of 160, a specific gravity at 20° C. of 1.07, a softening point ranging from 97.77-106.11° C., and a flash point of 217.77° C. These partially dimerized resins have an abietic acid dimer content of about 40 wt. %, with the remainder composed primarily of abietic acid monomers and trimers.

The second component of the desoldering flux employed in the present invention is an ester of a polyhydric alcohol and benzoic acid. The polyhydric alcohol-benzoic acid ester may be of the type disclosed in the aforementioned Arbib patent and include those derived from polyhydric alcohols containing from 2 to 8, and preferably from 3 to 6 hydroxyl groups, as disclosed in the Arbib patent. A preferred ester is derived from a polyhydric alcohol containing 4 hydroxyl groups, specifically pentaerythritol, to produce pentaerythritoltetrabenzoate. As noted previously, an important distinction between the desoldering flux formulation employed in the present and the soldering flux of the Arbib patent is in the relative amounts of the ester and rosin components as disclosed in the Arbib patent. The esters disclosed there are employed in amounts well in excess of the rosin component. A suitable ester for use in the present invention is pentaerythritoltetrabenzoate, available from Unitex Chemical Corporation under the designation Uniplex 552. This ester has a melting point of about 103-105° C.

The third component which is present in a very small amount, is an aliphatic dicarboxylic acid, preferably having from 6 to 10 carbon atoms. The dicarboxylic acid preferred for use in the present invention contains from 8 to 10 carbon atoms. In a particularly preferred embodiment, the dicarboxylic acid is a sebacic acid. Sebacic acid suitable for use in the invention is available from Aldrich Chemical Company, Inc. under the product number designation 283258.

The sebacic acid or other dicarboxylic acid is normally employed in an amount within the range of 0.1-5.0 wt. % of the composite amount of the first and second desoldering flux components. More preferably, the dicarboxylic acid is employed in an amount within the range of 0.3-0.5 wt. % of the composite of the first and second flux components.

As noted previously, the desoldering flux formulation is incorporated in the wick structure within the range of 1-5 wt. % of the wick structure and more preferably, within the range of 1-3 wt. % of the wick structure. At least a portion of the desoldering flux is located within the longitudinally extending interior bore of the wick structure, with another portion of the desoldering flux located within the interstices of individual helically wound strands. When employing the wick structure of FIG. 4, the wick is heated by any suitable technique, such as by the application of a soldering iron and as the solder contaminant is melted, the melted contaminant flows preferentially within the interior bore of the wick structure. While the wick structure characterized by an internal bore as shown in the drawings is highly preferred in carrying out the present invention, it will be recognized that the invention can be carried out with other wicks which are formulated of individual strands which need not necessarily be configured to provide the bore configuration as shown in the previously described wick structures.

Having described specific embodiments of the present invention, it will be understood that modifications thereof may be suggested to those skilled in the art, and it is intended to cover all such modifications as fall within the scope of the appended claims.

The invention claimed is:

1. A desoldering wick comprising:
    (a) a wick structure comprising a plurality of heat conductive metal strands adapted to be placed into contact with a surface for the removal of solder therefrom;
    (b) a desoldering flux incorporated with said wick structure to provide a surface coating on at least a portion of said metal strands, said desoldering flux comprising a mixture of a first component of a partially polymerized rosin having a melting point of at least 98° C., a second component comprising an ester of a polyhydric alcohol and benzoic acid in an amount which is no more than the amount of said first component, and a third component comprising a dicarboxylic acid having from 2 to 12 carbon atoms which is present in an amount which is less than the amount of said second component.

2. The desoldering wick of claim 1 wherein said second component is present in an amount which is less than the amount of said first component.

3. The desoldering wick of claim 1 wherein said desoldering flux is incorporated into said wick structure in an amount within the range of 1-5 wt. % of said wick structure.

4. The desoldering wick of claim 1 wherein said desoldering flux is incorporated into said wick structure in an amount within the range of 1-3 wt. % of said wick structure.

5. The desoldering wick of claim 1 wherein said first flux component and said second flux component are present in amounts to provide a weight ratio of said first component to said second component within the range of 1:1-4:1.

6. The desoldering wick of claim 5 wherein the weight ratio of said first component to said second component is within the range of 2:1-4:1.

7. The desoldering wick of claim 5 wherein the weight ratio of said first component to said second component is about 3:1.

8. The desoldering wick of claim 1 wherein said dicarboxylic acid is present in an amount within the range of 0.1-5.0 wt. % of the composite amount of said first and second flux components.

9. The desoldering wick of claim 8 wherein said dicarboxylic acid is present in an amount within the range of 0.3-0.5 wt. % of the composite of said first and second flux components.

10. The desoldering wick of claim 1 wherein said wick structure comprises an elongated multi-strand structure wherein the individual strands of said multi-strand structure are configured in a helical configuration along the longitudinal axis of said wick structure.

11. The desoldering wick of claim 10 wherein said wick structure has an internal bore extending along the major axis of said wick structure.

12. The desoldering wick of claim 10 wherein said wick structure is configured to have an ellipsoidal cross-section.

13. The desoldering wick of claim 12 wherein the ratio of the width of said wick structure to the thickness of said wick structure is within the range of 4-15.

14. The desoldering wick of claim 12 wherein the ratio of the width of said wick structure to the thickness of said wick structure is within the range of 6-10.

15. The desoldering wick of claim 1 wherein said first flux component is a partially polymerized rosin having an abietic acid dimer content within the range of 30-50%, said second flux component is pentaerythritol tetrabenzoate and said third flux component is $C_8$-$C_{10}$ dicarboxylic acid.

16. The desoldering wick of claim 15 wherein said first component has an abietic acid dimer content of about 40 wt. % and said third flux component is sebacic acid.

17. The desoldering wick of claim 16 wherein said wick structure is configured to have a flattened ellipsoidal cross-section having an internal bore extending along the longitudinal axis of said wick structure and having a ratio of the transverse width of said wick structure to the thickness of said wick structure within the range of 4-15.

18. A method for recovering a solder contaminant from a substrate surface comprising:
    (a) providing an elongated wick structure comprising a plurality of heat conductive metal strands;
    (b) providing a desoldering flux comprising a mixture of a first component of a partially dimerized rosin having a melting point of at least 98° C., a second component comprising an ester of a polyhydric alcohol and benzoic acid in an amount which is no more than the amount of said first component, and a third component comprising an aliphatic dicarboxylic acid which is present in an amount which is less than the amount of said second component;
    (c) contacting said solder contaminant on said substrate surface with said wick structure in the presence of said desoldering flux and heating said wick structure and said solder contaminant to a temperature sufficient to melt said solder contaminant whereby said solder contaminant flows into the said wick structure in contact with said metal strands; and
    (d) withdrawing said wick structure containing said contaminant solder from said substrate surface.

19. The method of claim 18 wherein at the time of contacting said solder contaminant with said wick structure, at least a portion of said desoldering flux is incorporated within said wick structure to provide a surface coating on at least a portion of said metal strands of said wick structure.

20. The method of claim 19 wherein said wick structure has an internal bore along the longitudinal axis of said wick structure and at least a portion of the desoldering flux incorporated within said wick structure, is located within said interior bore.

21. The method of claim 20 wherein said first flux component and said second flux component are present in said desoldering flux in amounts to provide a weight ratio of said first component to said second component within the range of 1:1-4:1.

22. The method of claim 21 wherein the weight ratio of the first component of said desoldering flux to the second component of said desoldering flux is within the range of 2:1-4:1.

23. The method of claim 22 wherein said desoldering flux is incorporated within said wick structure in an amount within the range of 1-5 wt. % of said wick structure.

24. The method of claim 23 wherein said desoldering flux is incorporated within said wick structure in an amount within the range of 1-3 wt. % of said wick structure.

25. The method of claim 24 wherein said first flux component is a partially polymerized rosin having an abietic acid dimer content within the range of 30-50%, said second flux component is pentaerythritol tetrabenzoate and said third flux component is $C_6$-$C_{10}$ dicarboxylic acid.

26. The method of claim 25 wherein said first component has an abietic acid dimer content of about 40 wt. % and said third flux component is sebacic acid.

27. The method of claim 19 wherein said wick structure is configured to have a flattened ellipsoidal cross-section having an internal bore extending along the longitudinal axis of said wick structure and having a ratio of the transverse width of said wick structure to the thickness of said wick structure within the range of 4-15.

28. The method of claim 27 wherein at least a portion of the desoldering flux incorporated within said wick structure is located within the interior bore of said wick structure.

29. The method of claim 28 wherein said solder contaminant flows within said wick structure, preferentially within the interior bore of said wick structure.

* * * * *